United States Patent
Bakucz

(10) Patent No.: US 10,872,528 B2
(45) Date of Patent: Dec. 22, 2020

(54) DETERMINING AN AVAILABILITY OF A PARKING SPACE FOR A MOTOR VEHICLE

(71) Applicant: Robert Bosch GmbH, Stuttgart (DE)

(72) Inventor: Peter Bakucz, Klosterlechfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/477,091

(22) PCT Filed: Jan. 16, 2018

(86) PCT No.: PCT/EP2018/051037
§ 371 (c)(1),
(2) Date: Jul. 10, 2019

(87) PCT Pub. No.: WO2018/134212
PCT Pub. Date: Jul. 26, 2018

(65) Prior Publication Data
US 2019/0355255 A1    Nov. 21, 2019

(30) Foreign Application Priority Data
Jan. 17, 2017    (DE) ................. 10 2017 200 685

(51) Int. Cl.
*G08G 1/14* (2006.01)
*G01S 7/41* (2006.01)
(Continued)

(52) U.S. Cl.
CPC ............. *G08G 1/143* (2013.01); *G01S 7/14* (2013.01); *G01S 7/418* (2013.01); *G01S 13/04* (2013.01)

(58) Field of Classification Search
CPC . G08G 1/01; G08G 1/14; G08G 1/143; G01S 13/00; G01S 13/003; G01S 13/02;
(Continued)

(56) References Cited

U.S. PATENT DOCUMENTS

2005/0213074 A1*  9/2005  Hoashi .................. G01C 3/08
                                                    356/4.09
2011/0267219 A1    11/2011  Kisliansky et al.
(Continued)

FOREIGN PATENT DOCUMENTS

| DE | 102010010579 A1 | 4/2011 |
| DE | 102015202782 A1 | 8/2016 |
| WO | 2015118084 A1 | 8/2015 |

OTHER PUBLICATIONS

International Search Report for PCT/EP2018/051037, dated Apr. 17, 2018.
(Continued)

*Primary Examiner* — Van T Trieu
(74) *Attorney, Agent, or Firm* — Norton Rose Fulbright US LLP; Gerard Messina

(57) ABSTRACT

A radar sensor is mounted in the area of a parking space for a motor vehicle in such a way that if a motor vehicle is present in the parking space, signals that are emitted by the radar sensor are reflected back from the motor vehicle. A method for determining an occupancy state of the parking space includes the steps of emitting radar signals; receiving reflected radar signals; and determining whether a motor vehicle is present in the parking space, based on the reflected radar signals. The determination is based on noise components of the reflected radar signals.

6 Claims, 3 Drawing Sheets

(51) Int. Cl.
*G01S 13/04* (2006.01)
*G01S 7/14* (2006.01)

(58) Field of Classification Search
CPC ...... G01S 13/0209; G01S 13/04; G01S 13/32;
G01S 13/325; G01S 13/86; G01S 17/00;
G01S 7/41; G01S 7/418; G01S 17/58;
G01S 17/93; G01S 7/00; G01S 7/58;
G01S 7/93
See application file for complete search history.

(56) References Cited

U.S. PATENT DOCUMENTS

| | | | |
|---|---|---|---|
| 2014/0225763 A1 | 8/2014 | Kavaler et al. | |
| 2017/0168155 A1* | 6/2017 | Richard | G01S 13/86 |
| 2019/0154439 A1* | 5/2019 | Binder | G01B 11/26 |

OTHER PUBLICATIONS

Kun Hu et al.,"Effect of Trends on Detrended Fluctuation Analysis", arxiv.org,Cornell University Library, 201 Olin Library Cornell University Ithaca, NY, 2001, XP080045426.

Li Yang et al., "Fractal-based weak target detection within sea clutter", Society of Oceanography, Heidelberg, vol. 33, No. 9, 2014, pp. 68-72, XP035383860.

Jan W. Kantelhardt et al., "Multifractal Detrended Fluctuation Analysis of Nonstationary Time Series", Physica A 316, 2002, pp. 87-114.

* cited by examiner

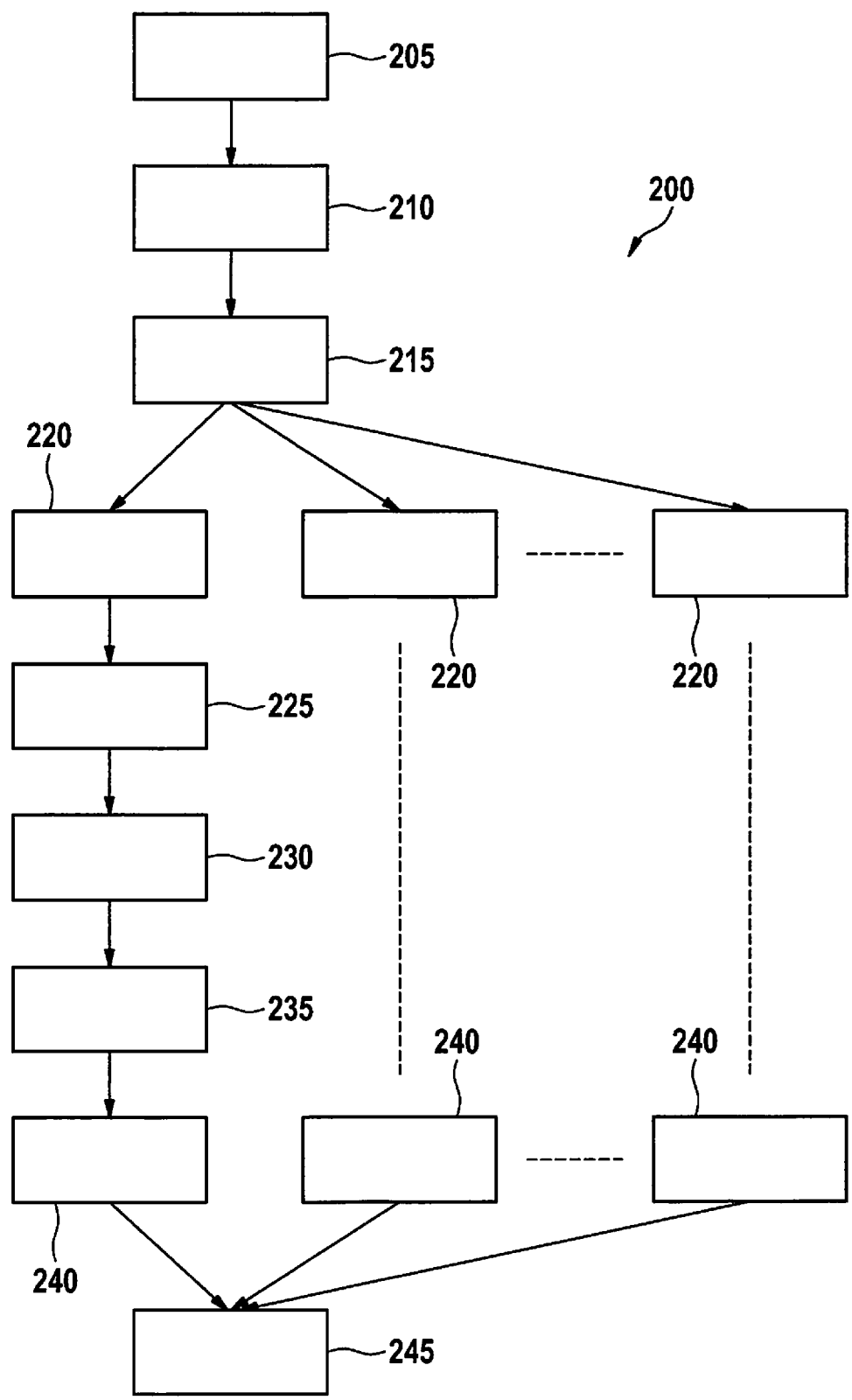

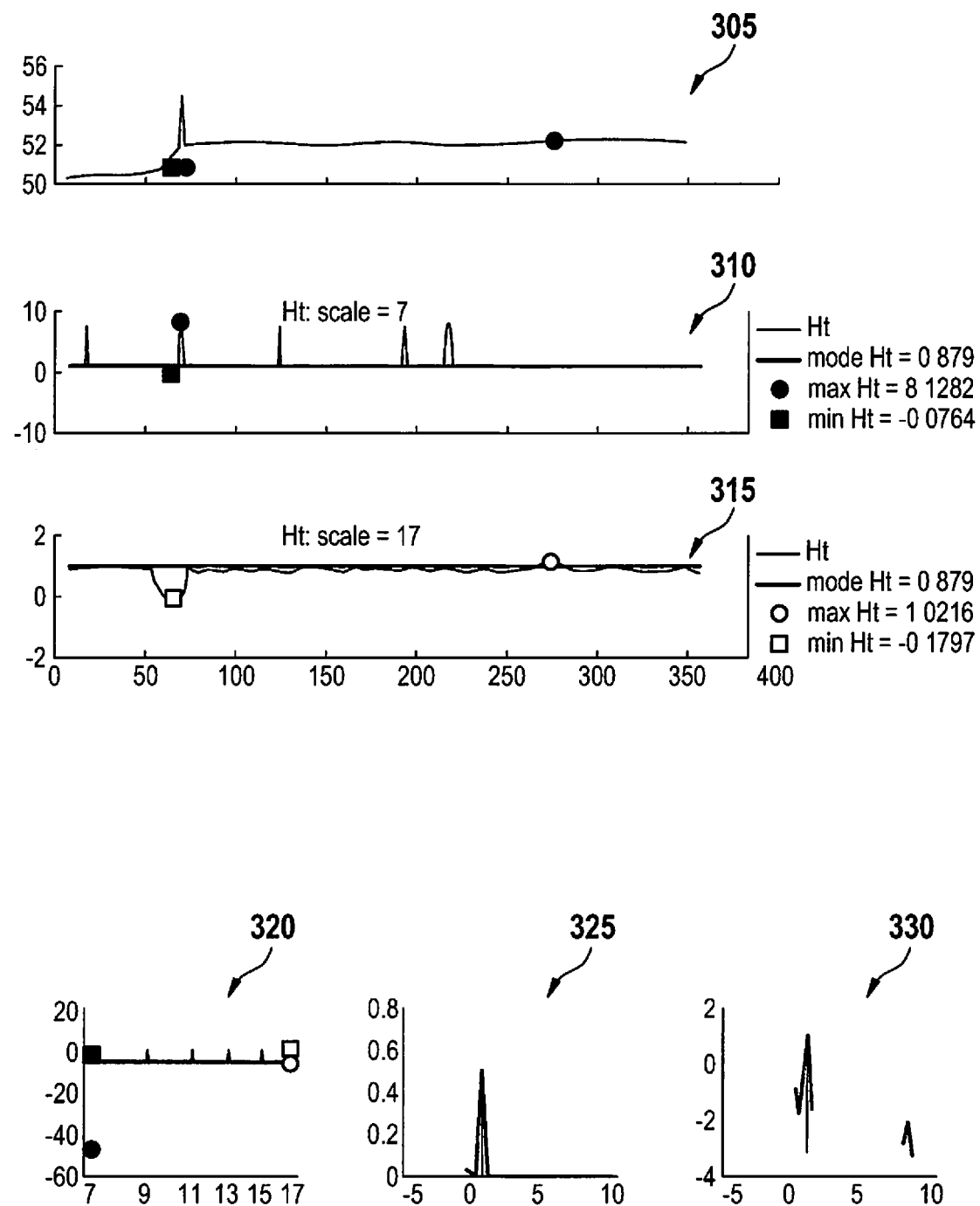

DETERMINING AN AVAILABILITY OF A PARKING SPACE FOR A MOTOR VEHICLE

FIELD OF THE INVENTION

The present invention relates to the determination of the availability of a parking space for a motor vehicle. In particular, the present invention relates to the determination, with the aid of radar signals, as to whether or not a motor vehicle is already present in a parking space.

BACKGROUND INFORMATION

A motor vehicle may be parked in a parking space if it is not already occupied, for example by another motor vehicle. While the location of a parking space may be known, for example based on map data of a navigation system, it is usually not known whether the parking space is also vacant. A motor vehicle driver may therefore be forced to drive to the parking space to determine its occupancy state.

Numerous parking spaces are present in a parking facility or in a parking deck. To facilitate finding a vacant parking space, an occupancy sensor may be provided at each parking space which determines on the basis of a magnetic sensor or radar signals, for example with the aid of ultrasound, whether a motor vehicle is already present in the parking space.

Patent document DE 10 2010 010 579 A1 refers to a radar sensor at a parking facility for a motor vehicle, and based on reflected radar signals, and to draw a conclusion as to whether or not a motor vehicle is present in the parking facility.

It may be difficult, based on reflections of radar signals, to reliably draw conclusions concerning the occupancy state of the parking space. Therefore, the object underlying the present invention is to provide an improved technique for determining the occupancy state with the aid of radar signals. The present invention achieves this object by the subject matter of the independent claims. The subclaims set forth specific embodiments.

SUMMARY OF THE INVENTION

A radar sensor is mounted in the area of a parking space for a motor vehicle in such a way that if a motor vehicle is present in the parking space, signals that are emitted by the radar sensor are reflected back from the motor vehicle. A method for determining an occupancy state of the parking space includes the steps of emitting radar signals; receiving reflected radar signals; and determining whether a motor vehicle is present in the parking space, based on the reflected radar signals. The determination is based on noise components of the reflected radar signals.

In contrast to known techniques that attempt to evaluate a useful signal, the occupancy state may thus be easily determined in a robust manner. The method may determine the presence or absence of the motor vehicle, regardless of a comparison. An initial measurement, in particular with the presence or absence of the motor vehicle being known, may be dispensed with. The method may be carried out periodically, for example, without having to store measuring results or measuring parameters for an assessment of a subsequent measurement. A device for carrying out the method may dispense with a memory for this information. In particular, it may not be necessary to provide a nonvolatile memory, for example to ensure the immediate functionality of the device after a power outage or a change of an energy store (battery) in the device.

The method may be used in particular for the automated management of a parking facility for a plurality of motor vehicles.

The method in particular may include the following steps: (a) determining a radar profile of a radar signal; (b) dividing the radar profile into a predetermined number of segments that are free of overlap; (c) determining the local trend for each segment; (d) forming an average over all segments to obtain a noise function; (e) determining the scaling characteristic of the fluctuation functions with the aid of graphical analysis; and (f) assessing the result by threshold value comparison.

The radar profile indicates the intensity of the radar signal as a function of its frequency. If the radar profile is divided into segments, each segment may encompass a predetermined frequency range. The local trend indicates the development over time of a value in a predetermined section. The local trend is generally the trend for a local vector. For example, a vector $V[1, \ldots, n]$ may be predetermined, and its trend between 50 and 100 may be searched.

In particular the mathematical aid of de-trended fluctuation analysis (DFA) may be used for this purpose. In general, time series, measurement series, or arbitrary equidistant sequences may thus be analyzed. DFA is used to quantify long-term correlations, and assists, among other things, in describing and predicting the behavior of complex systems. In this regard, reference is also made to Jan W. Kantelhardt, Stephan A. Zschiegner, Eva Koscielny-Bunde, Shlomo Havlin, Armin Bunde, H. Eugene Stanley: "Multifractal detrended fluctuation analysis of nonstationary time series", Physica A 316 (2002) 87-114.

The average over all segments may encompass the arithmetic mean of the signal intensities in the individual segments. The determination of the scaling characteristic may encompass a search for scalings in signals. A fluctuation A may scale exponentially, for example. In mathematical notation, $A \sim \exp(x)*a$. The fluctuation functions may correspond to noise functions.

The observation of noise components of the reflected radar signals may allow the presence or absence of the motor vehicle to be determined in an improved manner. The threshold values may be empirically determined, for example by analyzing radar signals of a radar sensor together with different motor vehicles.

It also may be that the radar signals have different frequencies, and that steps (a) through (e) are each carried out for scans of each of the radar frequencies. An improved analysis of noise signals may thus be carried out, which may allow a more reliable determination of the occupancy state.

A computer program product includes program code for carrying out the method according to one of the preceding claims, when the computer program product runs on a processing device or is stored on a computer-readable data medium.

A device for determining an occupancy state of a parking space for a motor vehicle includes: a radar sensor that is mounted in the area of the parking space in such a way that if a motor vehicle is present in the parking space, signals that are emitted by the radar sensor are reflected back from the motor vehicle, the radar sensor being configured for emitting radar signals and for receiving reflected radar signals; and a processing device for determining whether a motor vehicle is present in the parking space, based on the reflected radar signals. The determination is based on noise components of the reflected radar signals.

The processing device may in particular include a programmable microcomputer or microcontroller. It may be that the processing device is configured for carrying out at least a portion of the method stated above.

The device and the radar sensor may be integrated together. For this purpose, for example both may be installed in a shared housing.

The present invention is now described in greater detail with reference to the appended figures.

BRIEF DESCRIPTION OF THE DRAWINGS

FIG. 2 shows a flow chart of a method 200 for determining an occupancy state of a parking space.
FIG. 3 shows diagrams for illustrating one example of the method from FIG. 2.

DETAILED DESCRIPTION

Figure 1:
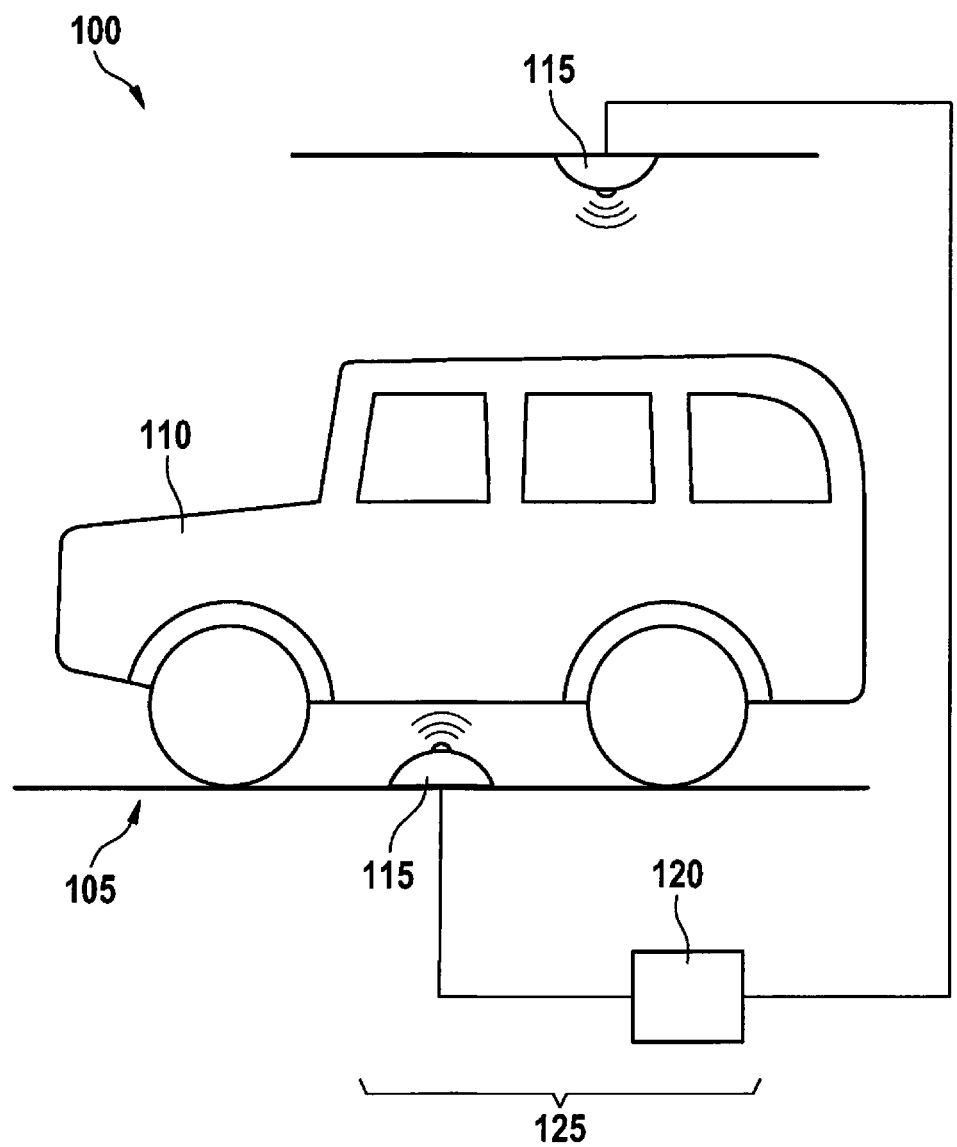
FIG. 1 shows a schematic illustration of a system.

FIG. 1 shows a schematic illustration of a system 100 with a parking space 105, a motor vehicle 110, a radar sensor 115, and a processing device 120. Parking space 105 may be arbitrarily situated, for example in an open-air parking facility, on a roadside, in an underground parking garage, or in a parking deck. Radar sensor 115 may be situated above or below motor vehicle 110 and vertically oriented. Only one radar sensor 115 is generally used, although two radar sensors 115 are shown in FIG. 1 for better illustration. In other specific embodiments, radar sensor 115 may also be mounted approximately at knee height and oriented in the horizontal direction, for example. Motor vehicle 105 may encompass an automobile, in particular a passenger vehicle. Motor vehicle 105 may also encompass a motorcycle. Radar sensor 115 is configured for emitting radar signals and receiving reflected radar signals. Radar signals of different frequencies in a predetermined spectrum may be used.

Processing device 120 is configured for determining an occupancy state of parking space 105 based on received radar signals of radar sensor 115. The state may encompass the values "vacant" or "occupied," and indicates whether or not parking space 105 can be occupied by another motor vehicle 110. Processing device 120 generally includes a programmable microcomputer or microprocessor. Processing device 120 together with radar sensor 115 may be integrated into a device 125.

In another specific embodiment, radar sensor 115 or processing device 120 includes an interface via which a previously determined occupancy state of parking space 105 may be provided to the outside. The interface may lead to a processing device of a parking management system that manages a plurality of parking spaces 105. The parking management system may guide a motor vehicle 110 or a motor vehicle driver who is driving motor vehicle 110 to a parking space 105 whose occupancy state is "vacant" so that motor vehicle 110 may be parked there.

FIG. 2 shows a flow chart of a method 200 for determining an occupancy state of a parking space 105. Method 200 may be carried out in particular on processing device 120 of system 100 from FIG. 1.

In summary, within the scope of method 200, radar profiles are initially formed from the radar signal, based on DFA. N non-overlapping segments are then formed. The local trend is subsequently removed, and the qth Hurst exponent is then formed. The multifractal spectrum and probability distributions are computed from h(q) functions.

Radar signals are emitted with the aid of radar sensor 115 in a first step 205, and are reflected on motor vehicle 110 in a step 210 if the motor vehicle is present in the parking space 105 before the radar signals are received by radar sensor 115 in a step 215. N radar signals of different frequencies are generally used which may be emitted simultaneously or in a time-delayed manner and received. The absolute values of the scans may be determined as the square root of (phase$^2$+ amplitude$^2$).

It is assumed that $x_k$ is a series of radar signals, each having length N; i.e., k time-delayed scans of the reflected radar signal are present. Such a series $x_k$ is present for each of the frequencies used. The analysis takes place separately for each channel, each channel encompassing a predetermined radar frequency. One typical radar sensor, called "LRR3", that is known in the automotive field includes, for example, eight channels with one radar frequency each, so that eight noise signals 8 may also be scanned. Each noise signal corresponds to a channel. It may be that N 75; i.e., at least 75 successive scans are present. The series should be compact, so that $x_k$=0 only for an insignificant portion of the scans.

Steps 220 through 240 are then carried out for each of the emitted frequencies. A radar profile Y(i) is initially determined in step 220:

$$Y(i) = \sum_{k=1}^{i} |x_k - \langle x \rangle|, \quad \text{(Equation 1)}$$

where i denotes the time-dependent index of a measured value, and <x> denotes the average value of x.

Radar profile Y(i) is divided into a number of $N_s$ segments of equal length in subsequent step 225. For this purpose, number N of scans is divided by a desired time constant s, so that $N_s \cong$ int(N/s). int(x) is the integer closest to x.

This division can generally be carried out only with a remainder, so that, figuratively speaking, some values remain at the end of radar profile Y(i) that are not associated with a segment. To also take these values into account, it may be provided to reverse the series and carry out the division again, so that a total of 2N segments are formed.

A local development (the trend) is then determined for each of the 2N segments in a step 230. The least squares method in particular may be used for this purpose. Variance F may be determined as follows:

$$F^2(s, v) = \frac{1}{s}\sum_{k=1}^{i} |Y(v-1)s + i - y(i)|, \quad \text{(Equation 2)}$$

where v indicates the previously formed segments, and v=$N_s$+1, . . . , 2 $N_s$, y(i) is the polynomial formed using the least squares method. Since the analysis includes the subtraction of a polynomial approximation from the formed radar profile, development trends of different quality may be determined, depending on the approximation function used. A comparison of the results for different orders of the noise analysis may allow an estimation of the type of polynomial development trend of the occupancy state of the scan series.

An average over all segments is determined in a step 235 to determine a noise function of order q. q may have any value except 0.

The scaling characteristic of the fluctuation functions or the noise functions is subsequently determined in a step 240. For this purpose, value pairs of s and $F_q(s)$ may be plotted for each value of q as a graphical representation in a double logarithmic coordinate system, resulting in a graphical representation. In the present specific embodiment, q varies from 2 to 1024. If series $x_i$ are correlated according to the long-range power law (where $x_i$ is the ith element in the noise profile), $F_q(s)$ increases for large values of s.

The increase may be expressed in particular as $F_q(s) \propto s^{b(q)}$. h(q) is the scaling function for approximating fluctuations.

Lastly, it may be decided in a step 245 whether or not a motor vehicle 105 is present in the area of radar sensor 115 by combining the determinations of steps 240 for all frequencies used. The following heuristics may be used for this purpose:

IF the incremental angle of the graphical representation is >0.13

AND the midpoint of the probability distribution function of Ph is >5

AND the midpoint of the multifractal spectrum of Dh is >7,

THEN the status of parking space 105 is "occupied". Otherwise, the status is "vacant". In other specific embodiments of method 200, values other than the threshold values stated here may be used for the comparisons.

Ht is the t-th Hurst exponent that is known from DFA. The probability distribution and the multifractal spectra are computed from scaling functions (h(q)).

FIG. 3 shows six diagrams 305 through 330 for illustrating one example of method 200 from FIG. 2. It is noted that the illustrated values and graphs are strictly by way of example.

Diagrams 305, 310, and 315 show a time in the form of scans (0 through 400) in the horizontal direction. In first diagram 305 an amplitude, and in second diagram 310 and in third diagram 315 Ht, are plotted in the vertical direction.

Scale s, i.e., the number of scans per segment (q scale divided by the segment size), is plotted in the horizontal direction in fourth diagram 320, and $\log_2$ (RMS), i.e., the RMS values on a logarithmic scale, is/are plotted in the vertical direction.

Fifth diagram 325 shows a probability distribution (Ph) of Ht. Ht is plotted in the horizontal direction and Ph is plotted in the vertical direction.

Sixth diagram 330 shows a multifractal spectrum (Dh). Ht is plotted in the horizontal direction and Dh is plotted in the vertical direction.

The incremental angle of the graphical representation is 0.09, and the midpoint of the probability distribution of Ht is less than 5. The midpoint of the multifractal spectrum of Dh is less than 7. Based on the heuristics described above, parking space 105 in question is therefore classified as "vacant".

What is claimed is:

1. A method for determining an occupancy state of a parking space for a motor vehicle with a radar sensor, the method comprising:
    emitting radar signals, wherein the radar sensor is mounted in an area of the parking space so that if a motor vehicle is present in the parking space, signals that are emitted by the radar sensor are reflected back from the motor vehicle;
    receiving reflected radar signals;
    determining whether a motor vehicle is present in the parking space, based on the reflected radar signals, wherein the determination is based on noise components of the reflected radar signals,
    a) determining a radar profile; and
    b) dividing the radar profile into a predetermined number of segments that are free of overlap.

2. A method for determining an occupancy state of a parking space for a motor vehicle with a radar sensor, the method comprising:
    emitting radar signals, wherein the radar sensor is mounted in an area of the parking space so that if a motor vehicle is present in the parking space, signals that are emitted by the radar sensor are reflected back from the motor vehicle;
    receiving reflected radar signals;
    determining whether a motor vehicle is present in the parking space, based on the reflected radar signals, wherein the determination is based on noise components of the reflected radar signals,
    a) determining a radar profile;
    b) dividing the radar profile into a predetermined number of segments that are free of overlap;
    c) determining a local trend for each segment;
    d) forming an average over all segments to obtain a noise function;
    e) determining a scaling characteristic of the fluctuation functions with aid of graphical analysis; and
    f) assessing a result by threshold value comparison.

3. The method of claim 2, wherein the radar signals have different frequencies, and a) through e) are each carried out for scans of each of the radar frequencies.

4. A non-transitory computer readable medium having a computer program, which is executable by a processor, comprising:
    a program code arrangement having program code for determining an occupancy state of a parking space for a motor vehicle with a radar sensor, by performing the following:
    emitting radar signals, wherein the radar sensor is mounted in an area of the parking space so that if a motor vehicle is present in the parking space, signals that are emitted by the radar sensor are reflected back from the motor vehicle;
    receiving reflected radar signals;
    determining whether a motor vehicle is present in the parking space, based on the reflected radar signals, wherein the determination is based on noise components of the reflected radar signals,
    determining a radar profile; and
    dividing the radar profile into a predetermined number of segments that are free of overlap.

5. A device for determining an occupancy state of a parking space for a motor vehicle, comprising:
    a radar sensor, which is mounted in an area of the parking space so that if a motor vehicle is present in the parking space, signals that are emitted by the radar sensor are reflected back from the motor vehicle, wherein the radar sensor is configured to emit radar signals and to receive reflected radar signals; and
    a processing device to determine whether a motor vehicle is present in the parking space, based on the reflected radar signals, wherein the determination is based on noise components of the reflected radar signals, and to determine a radar profile, and divide the radar profile into a predetermined number of segments that are free of overlap.

6. The device of claim 5, wherein the device and the radar sensor are integrated together in a housing.

* * * * *